Patented Aug. 18, 1953

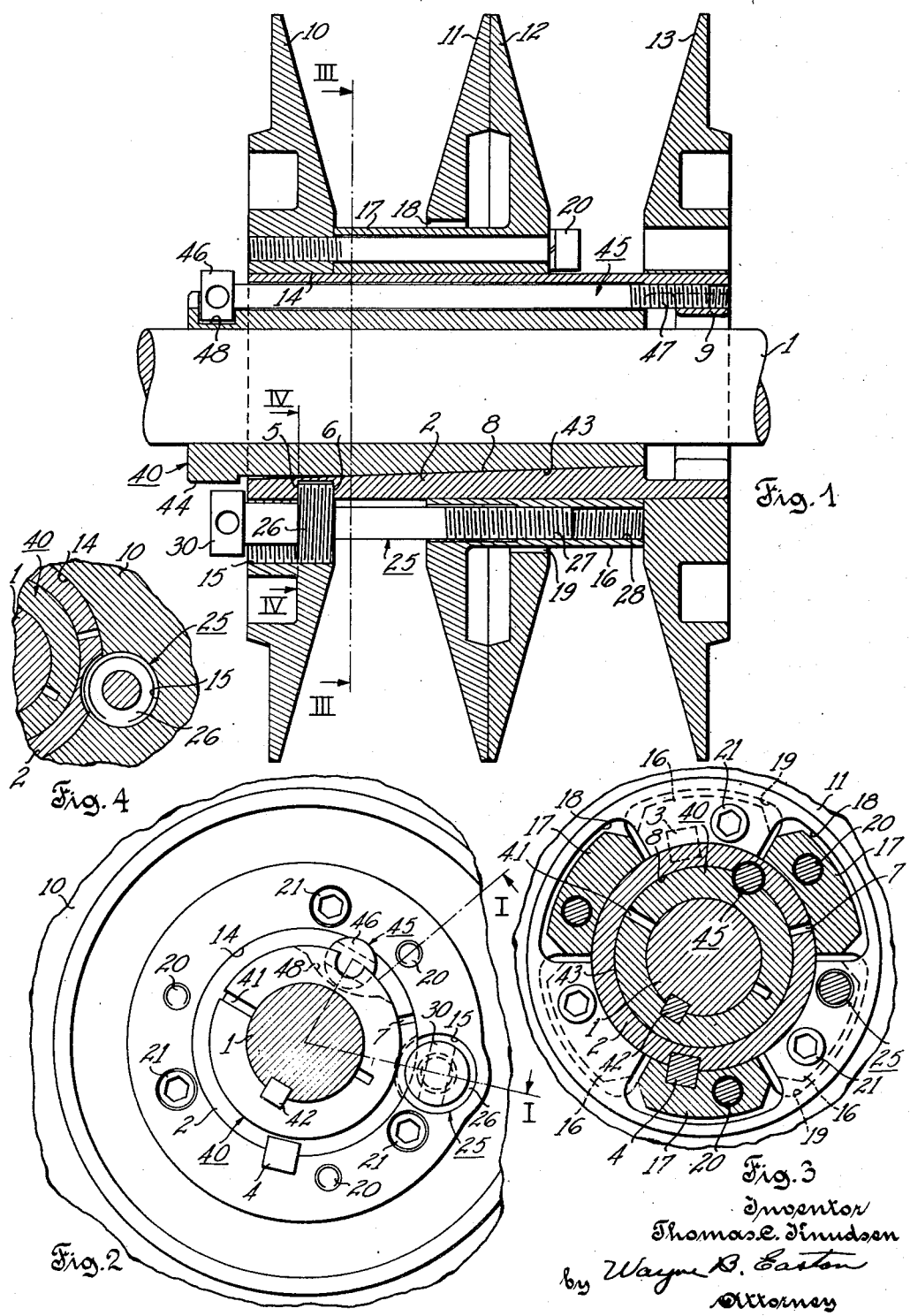

2,648,988

UNITED STATES PATENT OFFICE 2,648,988

ADJUSTABLE PITCH SHEAVE

Thomas C. Knudsen, Wauwatosa, Wis., assignor to Allis-Chalmers Manufacturing Company, Milwaukee, Wis.

Application March 5, 1952, Serial No. 274,863

5 Claims. (Cl. 74—230.17)

1

This invention relates to an improvement in expansible V-belt pulleys of the type in which opposed frusto-conical surfaces are axially movable toward and away from each other to increase and decrease the effective pitch diameter of the pulley.

More specifically the invention pertains to means for adjusting the effective pitch diameter of multiple groove V-belt pulleys of the type comprising two movable sets of conical disks, each set comprising a plurality of disks in alternating relation with disks of the other set, the disks of each set being spaced from adjacent disks of the same set by rigid connecting means which pass through apertures in the intervening disks of the other set.

The general object of the invention is to provide a new and improved mechanism for adjustably varying the effective pitch diameter of multiple groove V-belt pulleys of the type referred to. A special advantage of the new and improved adjusting mechanism is that it permits the pulley to assume selected pitch diameters throughout a very wide range.

Other objects will appear from the following description and drawing in which:

Fig. 1 is a view of a multiple groove pulley embodying the invention, shown in section on a longitudinal plane through the axis of rotation and taken on line I—I of Fig. 2;

Fig. 2 is an end view of the pulley shown in Fig. 1, viewed from the left side;

Fig. 3 is a cross section taken on line III—III of Fig. 1; and

Fig. 4 is a fragmentary cross section taken on line IV—IV of Fig. 1.

The illustrated pulley is shown mounted on a drive shaft 1 which may be either a driven or driving member. The pulley has a rotary power transmission member or support member 2 adapted for attachment to rotary shaft 1 in the way illustrated in the drawing and described hereinafter or in various other ways known to those skilled in the art. Support member 2 has a generally cylindrical external surface and is provided with two conventional longitudinal keyways in which keys 3 and 4 are disposed. A slot is formed in the external surface of support member 2 having axially spaced walls 5 and 6 formed perpendicular to the axis of the support member.

On support member 2 are provided a series of disk elements 10, 11, 12 and 13. Disk 10 is termed an end disk and is annular in form with a central opening bounded by a substantially

2 continuous cylindrical bearing surface 14, broken only by a conventional keyway to fit key 4 and a recessed longitudinally threaded surface 15 which appears in section as an arc intersecting surface 14. Disk 13 is an annular end disk positioned at the opposite end of support member 2 and has a central opening bounded by a substantially continuous cylindrical bearing surface broken only by a conventional keyway to fit key 3. Disks 10 and 13 have frusto-conical belt engaging faces mutually facing each other.

The scope of the invention includes a construction utilizing end disks 10 and 13 alone as well as constructions in which end disks 10 and 13 are utilized with two or more intermediate disks 11 and 12. Intermediate disks 11 and 12, also having frusto-conical belt engaging faces, are generally annular in form and are respectively axially spaced from and clamped to end disks 13 and 10 so as to form two groups of oppositely facing disks. The two groups of disks are axially movable with respect to each other and support member 2. When two or more intermediate disks are utilized, the disks of the two groups are alternately arranged to form cooperating pairs of oppositely facing disks, the faces being movable toward and away from each other to increase and decrease the effective diameter of the pulley.

A preferred way of spacing and clamping the disks in each of the two groups is illustrated although other known ways may be utilized within the scope of the invention. Intermediate disks 11 and 12 are respectively formed with axially extending lugs 16 and 17 which are circumferentially spaced so that the lugs on each disk form an annular series. Between the respective lugs of disks 11 and 12 are openings 18 and 19 such that in assembly the set of lugs on each disk is interdigitated and passes through the openings between the set of lugs on the other disk. Suitable tie bolts 20 and 21 are passed through suitable holes in the lugs and end disk of their respective groups of disks and serve to clamp together the respective disks of each group so that the two groups are axially movable as units relative to each other and support member 2. One lug 16 has a longitudinal keyway cooperating with key 3 and one lug 17 has a longitudinal keyway cooperating with key 4, to prevent rotation of the respective groups of disks relative to support member 2.

The invention pertains particularly to new and improved means for axially moving the two groups of disks toward and away from each other to increase and decrease the effective pitch diameter of the pulley. To this end there is provided an actuating screw 25 having an enlarged peripherally threaded collar portion 26 and a reversed or oppositely threaded section 27 axially spaced from the collar. Collar 26 is extendable into the slot formed by walls 5 and 6 in support member 2 so that the actuating screw 25 is anchored axially with respect to the support member.

The actuating screw 25 is rotatable about its own axis, which is parallel to the axis of support member 2, and is adapted for threaded engagement with both groups of disks. Threaded collar 26 is formed with a diameter equal to that of the recessed longitudinally threaded surface 15 of disk 10 and cooperates in threaded engagement therewith. The oppositely threaded section 27 of the actuating screw is adapted to threadedly engage a disk of the opposite group and is shown by way of example as engaging a threaded bore 28 in disk 11. The threaded bore 28 may optionally be formed in disk 13 in that the disks which the actuating screw 25 threadedly engages need not necessarily be adjacent although it is convenient. A head 30 of smaller diameter than collar 26 is provided on the actuating screw 25 at the end opposite threaded section 27 to facilitate rotation of the actuating screw.

Threaded bore 28 is illustrated as being formed in a lug 16 of disk 11. An advantage of forming the threaded bore in the axially extended lug is that the entire length of the threaded section 27 of the actuating screw 25 remains enclosed during relative movement of the two groups of disks and is thus protected from being corroded by exposure to the atmosphere. It is contemplated that disk 10 be of sufficient width so that the threads of collar 26 also remain covered within the limits of the normal axial travel of disk 10.

When the disks of each cooperating pair of mutually facing disks are in a position such that rear surfaces of disks 11 and 12 abut, as in the position shown in the drawing, the effective pitch diameter of the pulley is at its smallest. By virtue of the manner in which the collar 26 of actuating screw 25 cooperates with disk 10 and support member 2, as described above, the pulley can be adjusted to assume various pitch diameters throughout a wide range in that disks 10 and 11, as well as disks 12 and 13, may be moved toward each other until they reach abutting relation in which position the effective pitch diameter of the pulley is at its greatest.

Assembly of the unit is accomplished by first placing actuating screw 25 into position with its collar 26 disposed between walls 5 and 6 of support member 2, mounting disk 11 from the right hand side and threading it a predetermined distance on the threaded section 27 of screw 25, mounting disk 10 from the left hand side and threading it on collar 26, mounting disks 12 and 13 from the right hand side, and clamping the disks in the respective groups together by inserting and tightening screws 20 and 21.

A preferred way of attaching support member 2 to shaft 1 is illustrated in the drawing. Mounted directly on shaft 1 is a sleeve 40 centrally bored for a sliding fit on shaft 1 and split throughout its length along a radial plane as at 41, the split or cut being of sufficient width to permit sleeve 40 to be contracted by clamping to tightly grip shaft 1. The shaft and sleeve may be provided with conventional key means indicated at 42. The outer surface of sleeve 40 is divided into a tapered portion 43 and a shoulder portion 44. Support member 2 is illustrated as being radially expansible by virtue of being split throughout its length along a substantially radial plane as at 7 and is provided with a tapered bore 8 having the same taper angle as tapered portion 43 of sleeve 40. Axial movement of support member 2 with respect to sleeve 40 causes sleeve 40 to contract radially so as to grip shaft 1 and causes support member 2 to expand radially so as to expand against and clamp disks 10, 11, 12 and 13 to the support member. The clamping action unites all the parts into a rigid power transmission unit.

A screw 45 having a head portion 46 and a threaded section 47, is provided for moving support member 2 axially with respect to sleeve 40 to effect clamping and unclamping of the disks 10, 11, 12 and 13 to shaft 1. A slot 48 is provided in shoulder portion 44 of sleeve 40 in which the head portion 46 of screw 45 is extendable to anchor screw 45 axially with respect to sleeve 40. A hole for receiving the shank portion of screw 45 is formed partly in the internal surface of support member 2 and partly in the external surface of sleeve 40. Support member 2 has an internal annular lug 9 at one end thereof provided with a threaded bore for receiving threaded section 47 of screw 45. Rotation of screw 45 therefor causes axial movement of support member 2 with respect to sleeve 40 to effect clamping of the disks to shaft 1.

In operation the screw 45 may be rotated to unclamp the disks from shaft 1 so that the desired pitch diameter may be obtained by rotatably adjusting actuating screw 25. Screw 45 may then be rotated to clamp the disks to shaft 1 to unite all the parts into a rigid power transmission unit.

The particular embodiment of the invention illustrated and described herein is illustrative only, and the invention includes such other modifications and equivalents as may readily occur to those skilled in the art, within the scope of the appended claims.

It is claimed and desired to secure by Letters Patent:

1. A variable pitch sheave construction comprising a support member with a generally cylindrical external surface and a slot defined in said external surface having axially spaced walls perpendicular to the axis of said support member, an actuating screw revolvable about an axis parallel to the axis of said support member having a threaded collar extendable into said slot and an oppositely threaded section axially spaced from said collar, a first annular disk slidably mounted on said support member having a threaded surface for threaded engagement with said collar which extends the entire width of said disk parallel to the axis of said first disk and which appears in section as an arc intersecting the inside circumference of said first disk, a second annular disk slidably mounted on said support member for threaded engagement with said oppositely threaded section on said actuating screw, and means for rotating said actuating screw in either direction whereby axial movement of said disks toward and away from each other may be effected.

2. A variable pitch sheave construction comprising a support member with a generally cylindrical external surface and a slot defined in said external surface having axially spaced walls perpendicular to the axis of said support member, an actuating screw revolvable about an axis parallel to the axis of said support member having a threaded collar extendable into said slot and an oppositely threaded section axially spaced from said collar, a first annular disk slidably mounted on said support member having a threaded surface for threaded engagement with said collar which extends the entire width of said disk parallel to the axis of said first disk and which appears in section as an arc intersecting the inside circumference of said first disk, a second annular disk slidably mounted on said support member having a threaded bore extending parallel to the axis of said second disk for threaded engagement with said oppositely threaded section on said actuating screw, and means for rotating said actuating screw in either direction whereby axial movement of said disks toward and away from each other may be effected.

3. A variable pitch sheave construction comprising a support member with a generally cylindrical external surface and a slot defined in said external surface having axially spaced walls perpendicular to the axis of said support member; an actuating screw revolvable about an axis parallel to the axis of said support member having a threaded collar extendable into said slot and an oppositely threaded section axially spaced from said collar; a first group of axially spaced annular disks clamped together as a unitary set slidably mounted on said support member, the end disk of said first group having a threaded surface for threaded engagement with said collar which extends the entire width of said end disk parallel to the axis of said end disk and which appears in section as an arc intersecting the inside circumference of said end disk; a second group of axially spaced annular disks slidably mounted on said support member in respective alternating relation with respect to the disks of said first group and clamped together to form a unitary set, at least one disk of said second group being in threaded engagement with said oppositely threaded section of said actuating screw; and means for rotating said actuating screw in either direction whereby axial movement of said groups of disks toward and away from each other may be effected.

4. A variable pitch sheave construction comprising a support member with a generally cylindrical external surface and a slot defined in said external surface having axially spaced walls perpendicular to the axis of said support member; an actuating screw revolvable about an axis parallel to the axis of said support member having a threaded collar extendable into said slot and an oppositely threaded section axially spaced from said collar; a first group of axially spaced annular disks clamped together as a unitary set slidably mounted on said support member, the end disk of said first group having a threaded surface for threaded engagement with said collar which extends the entire width of said end disk parallel to the axis of said end disk and which appears in section as an arc intersecting the inside circumference of said end disk; a second group of axially spaced annular disks slidably mounted on said support member in respective alternating relation with respect to the disks of said first group and clamped together to form a unitary set, at least one disk of said second group having a threaded bore extending parallel to its axis for threaded engagement with said oppositely threaded section of said actuating screw; and means for rotating said actuating screw in either direction whereby axial movement of said groups of disks toward and away from each other maybe effected.

5. A variable pitch sheave construction comprising a support member with a generally cylindrical external surface and a slot defined in said external surface having axially spaced walls perpendicular to the axis of said support member; an actuating screw revolvable about an axis parallel to the axis of said support member having a threaded collar extendable into said slot and an oppositely threaded section axially spaced from said collar; a first group of axially spaced annular disks clamped together as a unitary set slidably mounted on said support member, the end disk of said first group having a threaded surface for threaded engagement with said collar which extends the entire width of said end disk parallel to the axis of said disk and which appears in section as an arc intersecting the inside circumference of said end disk; a second group of axially spaced annular disks slidably mounted on said support member in respective alternating relation with respect to the disks of said first group and clamped together to form a unitary set, at least one disk of said second group having a set of axially extending lugs extending to an adjacent disk of said second group with one of said lugs having a threaded bore for threaded engagement with said oppositely threaded section of said actuating screw; and means for rotating said actuating screw in either direction whereby axial movement of said groups of disks towards and away from each other may be effected.

THOMAS C. KNUDSEN.

References Cited in the file of this patent

UNITED STATES PATENTS

| Number | Name | Date |
|---|---|---|
| 2,610,515 | Williams | Sept. 16, 1952 |